United States Patent
Rajagopalan (10) Patent No.: US 10,411,626 B2
(45) Date of Patent: Sep. 10, 2019

(54) DYNAMIC GENERATOR VOLTAGE CONTROL FOR HIGH POWER DRILLING AND LOGGING-WHILE-DRILLING

(71) Applicant: Halliburton Energy Services, Inc., Houston, TX (US)

(72) Inventor: Satish Rajagopalan, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 65 days.

(21) Appl. No.: 15/551,556

(22) PCT Filed: Oct. 13, 2016

(86) PCT No.: PCT/US2016/056841
§ 371 (c)(1),
(2) Date: Aug. 16, 2017

(87) PCT Pub. No.: WO2018/071028
PCT Pub. Date: Apr. 19, 2018

(65) Prior Publication Data
US 2018/0287533 A1    Oct. 4, 2018

(51) Int. Cl.
| | |
|---|---|
| *E21B 41/00* | (2006.01) |
| *H02M 7/162* | (2006.01) |
| *H02P 9/04* | (2006.01) |
| *H02M 7/219* | (2006.01) |
| *H02P 6/182* | (2016.01) |
| *H02P 29/64* | (2016.01) |
| *H02P 21/06* | (2016.01) |
| *E21B 4/04* | (2006.01) |

(Continued)

(52) U.S. Cl.
CPC .................. *H02P 9/04* (2013.01); *E21B 4/04* (2013.01); *E21B 41/0085* (2013.01); *H02M 7/219* (2013.01); *H02P 6/182* (2013.01); *H02P 9/009* (2013.01); *H02P 9/302* (2013.01); *H02P 21/06* (2013.01); *H02P 29/64* (2016.02)

(58) Field of Classification Search
CPC ............ E21B 41/0085; H02M 7/1623; H02M 7/1626
See application file for complete search history.

(56) References Cited

U.S. PATENT DOCUMENTS

| | | |
|---|---|---|
| 2005/0105306 A1 | 5/2005 | Deng et al. |
| 2011/0050184 A1 | 3/2011 | Said et al. |
| 2014/0077607 A1 | 3/2014 | Clarke et al. |

(Continued)

FOREIGN PATENT DOCUMENTS

WO    2016013987 A1    1/2016

OTHER PUBLICATIONS

Patent Cooperation Treaty, International Searching Authority, International Search Report and Written Opinion dated Jul. 11, 2017; International PCT Application No. PCT/US2016/056841.

*Primary Examiner* — Giovanna C Wright
(74) *Attorney, Agent, or Firm* — McGuireWoods LLP (57) ABSTRACT

A power generation system for a drilling tool includes a turbine, an alternator, a converter and a first active rectifier control (ARC). The turbine is adapted to be driven by a fluid flow in a well. The alternator is coupled to the turbine and generates an alternative current (AC). The converter converts the AC to direct current (DC) and carries out active rectification. The first active rectifier control (ARC) controls the active rectification of the converter.

16 Claims, 12 Drawing Sheets

(51) Int. Cl.
*H02P 9/00* (2006.01)
*H02P 9/30* (2006.01)

(56) References Cited

U.S. PATENT DOCUMENTS

2014/0354206 A1 12/2014 Vrankovic et al.
2016/0333670 A1* 11/2016 Tegeler ............... E21B 41/0085

* cited by examiner

DYNAMIC GENERATOR VOLTAGE CONTROL FOR HIGH POWER DRILLING AND LOGGING-WHILE-DRILLING

This is a 371 national stage application of International Patent Application No. PCT/US16/56841 filed Oct. 13, 2016, the disclosure of which is incorporated by reference herein in its entirety.

BACKGROUND OF THE INVENTION

Oil and natural gas drilling rigs are dispatched to identify geologic reservoirs and to create holes that allow the extraction of oil or natural gas from those reservoirs. Once a well has been drilled, the drilling rig is moved off of the well and a service rig that is purpose-built for completions is moved on to the well to get the well on line. This frees up the drilling rig to drill another hole and streamlines the operation.

A typical drilling rig is equipped with a downhole drilling tool, which is powered by a power generation system. The power generation system is typically constructed with a turbine of the drilling tool, an alternator driven by the turbine, one or more converters that convert AC voltage output from the alternator to DC voltage, and other electrical components. Due to various technical challenges, the power generation systems in drilling tools suffer several drawbacks, e.g., poor power factor, low efficiency, high current harmonic distortion, or the like. Accordingly, there is a need for a power generation scheme that provides a regulated DC supply, minimum input current harmonic distortion and unity power factor, wide input voltage range, and fast dynamic control.

BRIEF DESCRIPTION OF THE DRAWINGS

A better understanding of the present invention can be obtained when the following detailed description of example embodiments are considered in conjunction with the following drawings, in which.

DETAILED DESCRIPTION

A typical drilling rig employs logging-while-drilling (LWD) techniques which incorporates logging tools into the drill string, administering, interpreting and transmitting real-time formation measurements to the surface. The formation information may include, e.g., porosity, resistivity, acoustic waveform, hole direction weight on bit, or related information. Moreover, the LWD technique may include measurement-while drilling (MWD) which relates to information used to help in steering the drill, such as direction, orientation and drill bit information. Powering downhole tools such as logging tools in a drill string requires power. Power may be supplied by different techniques such as batteries or turbines. This present disclosure describes a technique for improved power generation for downhole tools within a wellbore or drill string.

Figure 1:
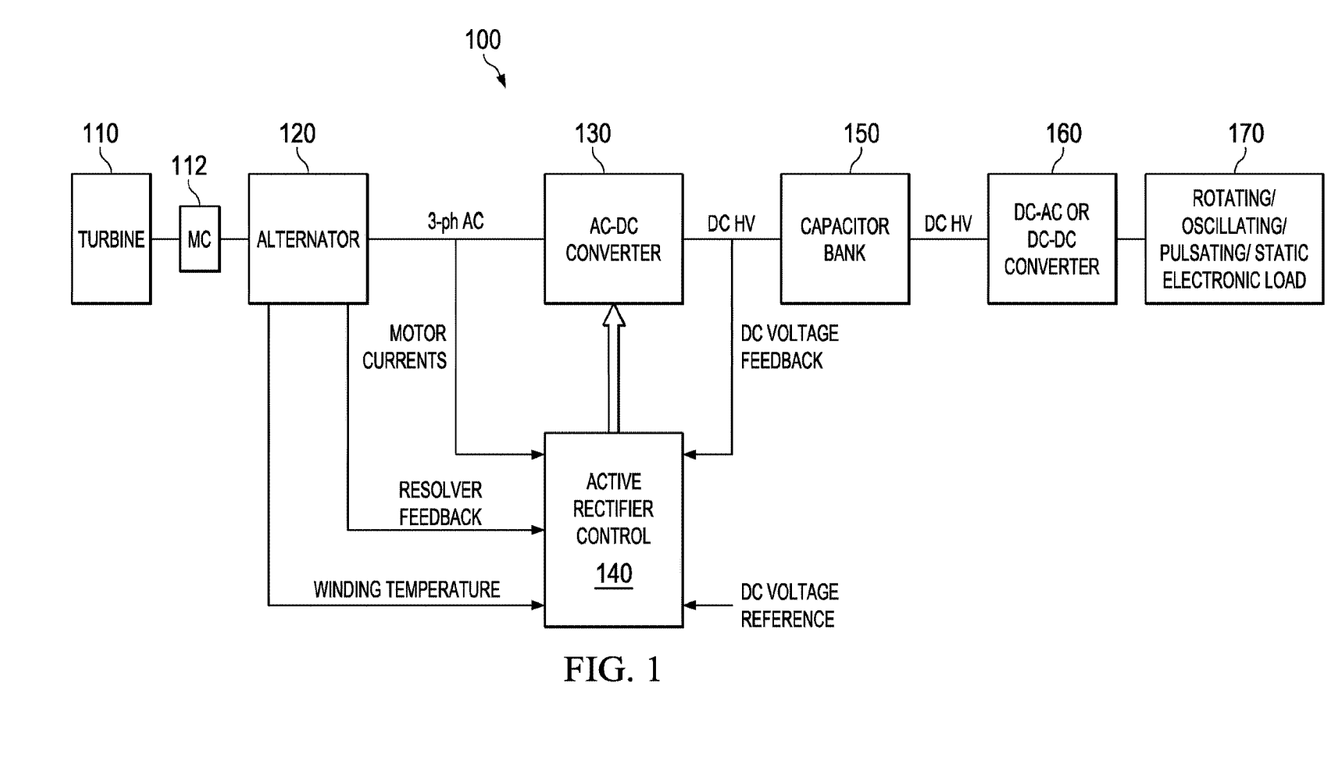
FIG. 1 shows an example of a power generation system, according to an embodiment of the disclosure.
Figure 2:
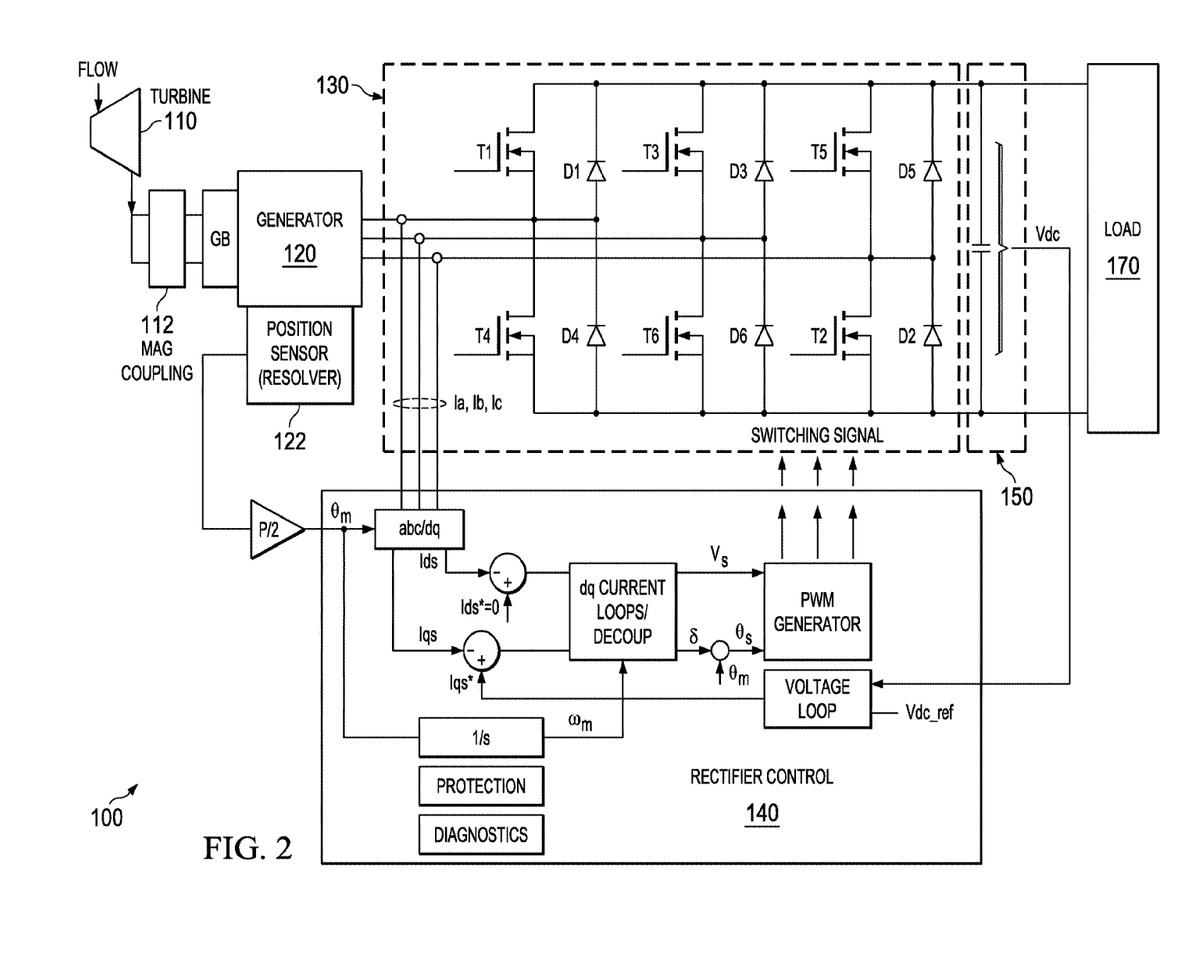
FIG. 2 shows a schematic diagram of an embodiment of the power generation system shown in FIG. 1.
Figure 3:
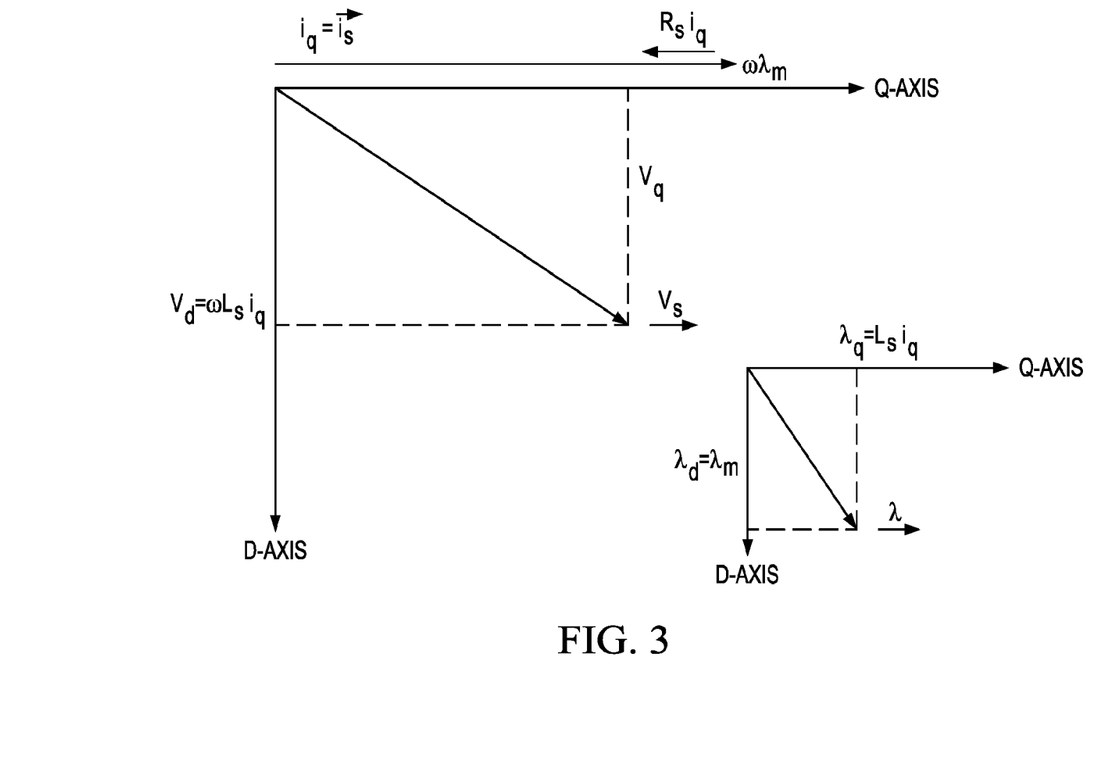
FIG. 3 shows a q-d vector diagram of a permanent magnet synchronous alternator.

FIG. 1 shows a block diagram of a power generation system 100, which may be used to power a downhole tools such as, e.g., a drilling tool and a measuring device, for oil and natural gas drilling rigs, constructed according to the principles of the disclosure. The power generation system 100 may be a turbine-driven alternator system with active electronic rectification. FIG. 2 shows a schematic diagram of the embodiment of the power generation system shown in FIG. 1.

Referring to FIGS. 1 and 2 concurrently, the system 100 may include a turbine 110, an alternator 120, a first converter 130, an active rectifier control (ARC) 140, a capacitor bank 150, a second converter 160, an electrical load 170. The turbine 110, the alternator 120 and one or more electronic units associated thereto are referred to as a generator assembly.

The turbine 110 may be spun by a fluid flow such as, e.g., drilling mud, created when a well is being drilled or related operation. The turbine 110 may be coupled to the alternator 120 via a magnetic coupling (MC) 112 to provide separation between the fluid and machine oil of the system 100. The magnetic coupling (MC) 112 may be coupled to the alternator 120 via a gear box (GB) 114 (shown in FIG. 2), which may be a part of the alternator 120. Alternatively, the turbine 110 and the alternator 120 may be coupled to each other through direct coupling with rotating seals. The alternator 120 may convert the mechanical energy from the turbine 110 to electrical energy in the form of alternating current (AC), for example, three-phase AC. The alternator 120 may include a position sensor or resolver 122 (shown in FIG. 2), which generates a resolver feedback.

The AC generated by the alternator 120 may be converted to direct current (DC) by the first converter 130, which may be an AC to DC converter. The first converter 130 may carry out bi-directional or unidirectional active rectification. The first converter 130 may be controlled by the ARC 140 to carry out the active rectification, which provides a regulated DC bus voltage with a unity power factor and high efficiency. The regulated DC bus voltage from the first converter 130 may be output to the second converter 160 via the capacitor bank 150. The second converter 160 may be a DC to AC converter, a DC to DC converter, or the like, which powers the electrical load 170. The electrical load 170 may include an inverter or one or more of rotating, oscillating, pulsating, static components of the drilling tool.

The first converter 130 may carry out the active rectification by employing one or more power converter topologies, such as, for example, two-level pulse width modulation (PWM) rectifier, Vienna converter, or the like. For example, FIG. 2 shows the first converter 130 may be implemented with a two-level PWM rectifier.

The ARC 140 may control the active rectification in the first converter 130. The ARC 140 may be a computer system (not shown) including a processor and a non-transitory computer readable storage medium storing instructions that, when executed by the processor, cause the computer to control the active rectification in the first converter 130. For example, the ARC 140 may collect the three-phase AC, a winding temperature, a resolver feedback from the alternator 120. The ARC 140 may also receive a DC feedback voltage $V_{dc}$ from the first converter 130, a DC reference $V_{dc\_ref}$ voltage, and/or the like.

As shown in FIG. 2, the ARC 140 may transform the three-phase AC to a quadrature axis outputting two DC quantities $I_{qs}$ and $I_{ds}$, which may allow to independently control torque and flux, respectively. A permanent magnet synchronous model in a dq reference frame may be characterized as follows:

$$v_q = -R_s + \omega(\lambda_m - L_s i_{ds})$$

$$v_d = -R_s i_{ds} + \omega L_s i_{qs}$$

$$T_e = \frac{2}{3} P[\lambda_m i_{qs}],$$

wherein $v_q$ refers to a q-axis voltage, $v_d$ refers to a d-axis voltage, $R_s$ refers to a stator resistance per phase, $L_s$ refers to a stator inductance per phase, $\omega$ refers to an alternator speed, $\lambda_m$, refers to a magnetizing flux, $T_e$ refers to an electromagnetic torque, and P refers to a number of poles. In FIG. 2, $\theta_s$ refers to a phase of the stator current phasor in the stationary reference frame, $\theta_m$ refers to a rotor flux position and $\delta$ refers to a torque angle. The DC Voltage feedback may be compared with the target reference $V_{dc\_ref}$. An error is driven to zero through a PI regulator, of which the output feeds the inner $I_{ds}$ and $I_{qs}$ current regulators. $I_{ds}$ may be set to zero (0) to achieve a unity power factor. The torque may be controlled by varying $I_{ds}$. As the result, the ARC 140 may output a set of control signals to the two-level PWM rectifier of the first converter 130. The set of control signals may be switching signals that control gate terminals of transistors of the two-level PWM rectifier, as shown in FIG. 2.

Figure 4:
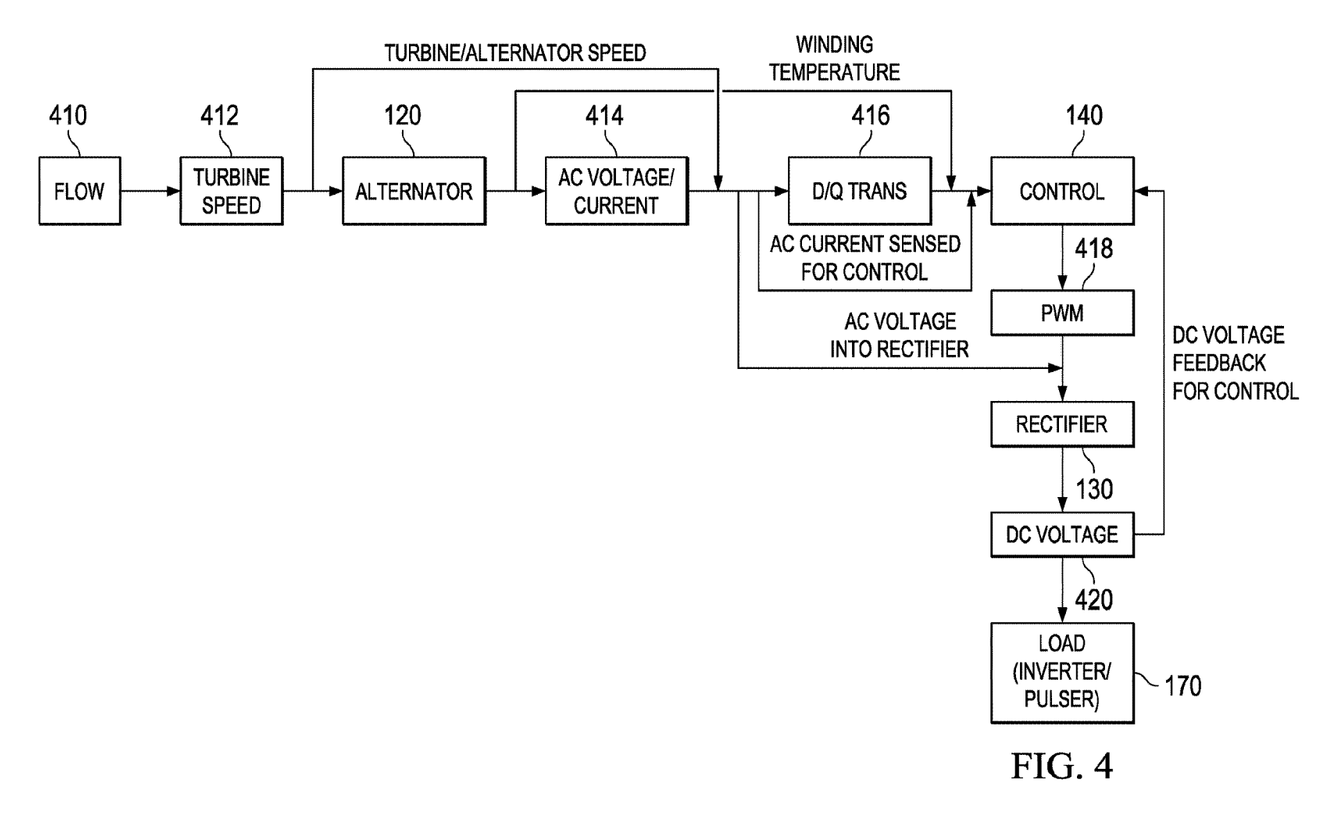
FIG. 4 shows a signal flow diagram showing an operational embodiment of the power generation system shown in FIGS. 1 and 2.

FIG. 4 shows a signal flow diagram showing an operational embodiment of the power generation system 100 shown in FIGS. 1 and 2. In the system 100, the fluid flow 410 may be translated to a speed 412 of the turbine 110. The turbine speed 412 is then transformed to the AC voltage/current 414 by the alternator 120. The turbine speed 412 and an alternator speed may be correlated. The turbine/alternator speed and the AC voltage/current 414 are provided for a direct-quadrature-zero (dq) transform, and the transform outcome is provided to the ARC 140 along with the AC current from the alternator 120 and the winding temperature from the alternator 120. The ARC 140 then performs pulse width modulation (PWM) 418 to generate the switching signals, which are then provided to the PWM rectifier in the first converter 130 along with the AC voltage from the alternator 120. The winding temperature may be used to adjust control parameters of the ARC 140 to account for any drift in the alternator resistance. The winding temperature may also be used by the ARC 140 for protection. The ARC 140 may decide to lower the AC power output from the first converter 130 or shut down the first converter 130 when an abnormal temperature increase is detected. The regulated DC bus voltage 420 from the second converter 160 is then fed back to the ARC 140 for the activate rectification control and is also output to power the load 170.

Typically, in an AC-DC-AC power conversion scheme, any regenerated energy from the load 170 may increase the voltage across the capacitor bank 150 since this excess energy has no place to go, which may cause electrical damage to the system 100. Additional costly circuitry would normally be required to avoid such damages and to protect the electronics of the first converter 130. In this disclosure, any regenerated energy from the load 170 may be diverted directly to the active rectifier of the first converter 130, which may load the turbine 110 to dissipate the excess energy. As such, a DC link over voltage protection scheme, such as, for example, a chopper, or the like, may no longer be necessary. This may be applied to both sensor-based and sensorless active rectifier schemes, of which the latter is described below in detail.

Figure 5:
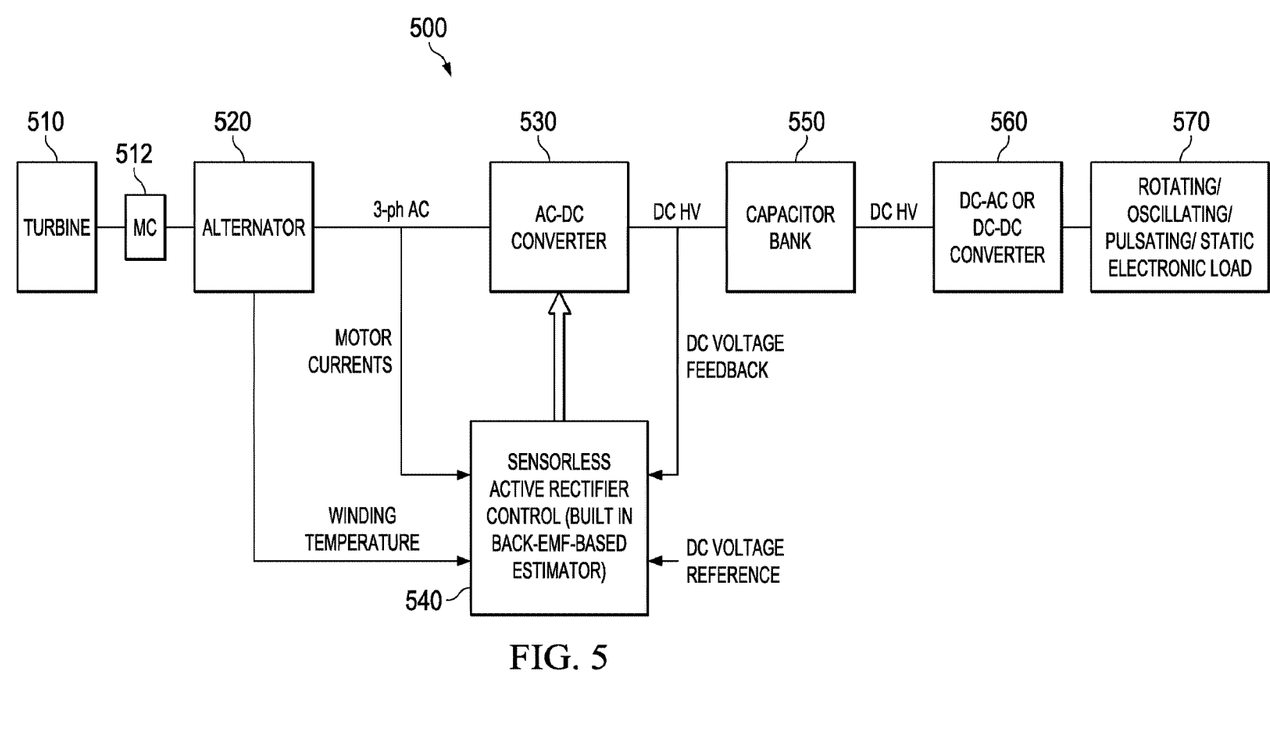
FIG. 5 shows an example of a power generation system according to another embodiment of the disclosure.
Figure 6:
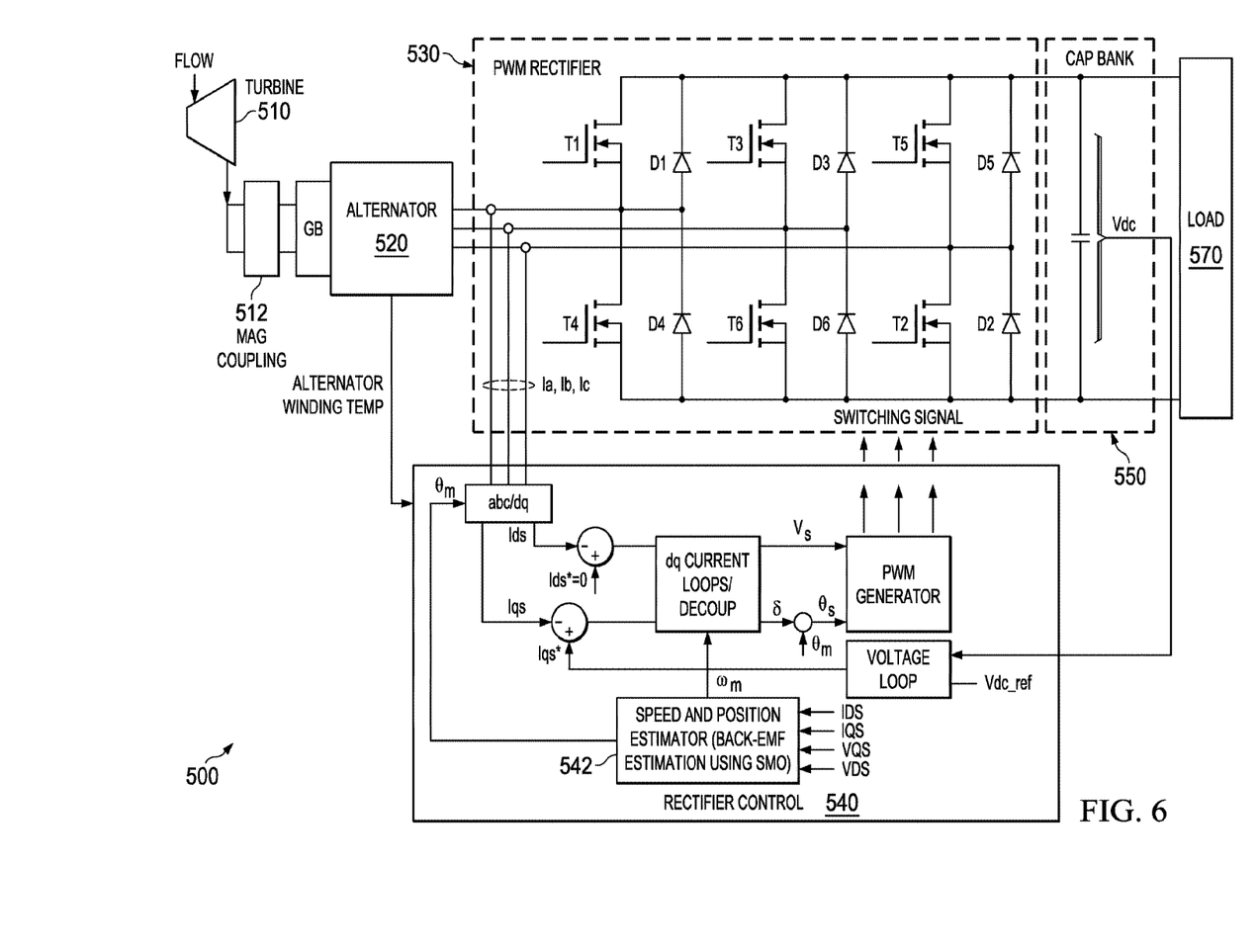
FIG. 6 shows a schematic diagram of an embodiment of the power generation system shown in FIG. 5.

Referring to FIGS. 1 and 2, the active rectifier in the first converter 130 of the system 100 may require a plurality of power connections (e.g., three power connections for the three-phase AC), a plurality of connections (e.g., six connections) from the resolver 122, a plurality of resistance temperature detector (RTD) connections (e.g., two connections). FIG. 5 shows an example of a power generation system 500 according to another embodiment of the disclosure, which carries out a sensorless rectification control to eliminate the need for the plurality of resolver connections. FIG. 6 shows a schematic diagram of an embodiment of the power generation system 500 shown in FIG. 5.

Referring to FIGS. 5 and 6 concurrently, the system 500 may include a turbine 510, an alternator 520, a first converter 530, a sensorless active rectifier control (ARC) 540, a capacitor bank 550, a second converter 560 and an electrical load 570. The system 500 may be constructed substantially similar to the system 100 shown in FIGS. 1 and 2 except that the system 500 may be implemented without the position sensor/resolver 122 shown in FIG. 2. For example, the alternator 520 may be coupled to the turbine 510 via a magnetic coupling 512. The first converter 530 may be coupled between the alternator 502 and the capacitor bank 550 and controlled by the sensorless ARC 540. The second converter 560 may be coupled between the capacitor bank 550 and the electrical load 570. The sensorless ARC 540 may be a computer system (not shown) including a processor and a non-transitory computer readable storage medium storing instructions that, when executed by the processor, cause the computer to control the active rectification in the first converter 530 without the resolver connections.

The system 500 may estimate a rotor flux instead of an actual measurement using a resolver. For example, the sensorless ARC 540 may include a built-in speed and position estimator 542, which estimates a back-electromotive force (EMF) using, for example, a sliding-mode observer (SMO) or the like, and thereby estimates the rotor flux angle and speed. The estimator 542 may need two sensed currents $I_{ds}$, $I_{qs}$ and internally estimated voltages $V_{qs}$, $V_{ds}$. The winding temperature of the alternator 520 may be used to compensate for any parameter changes.

Figure 7:
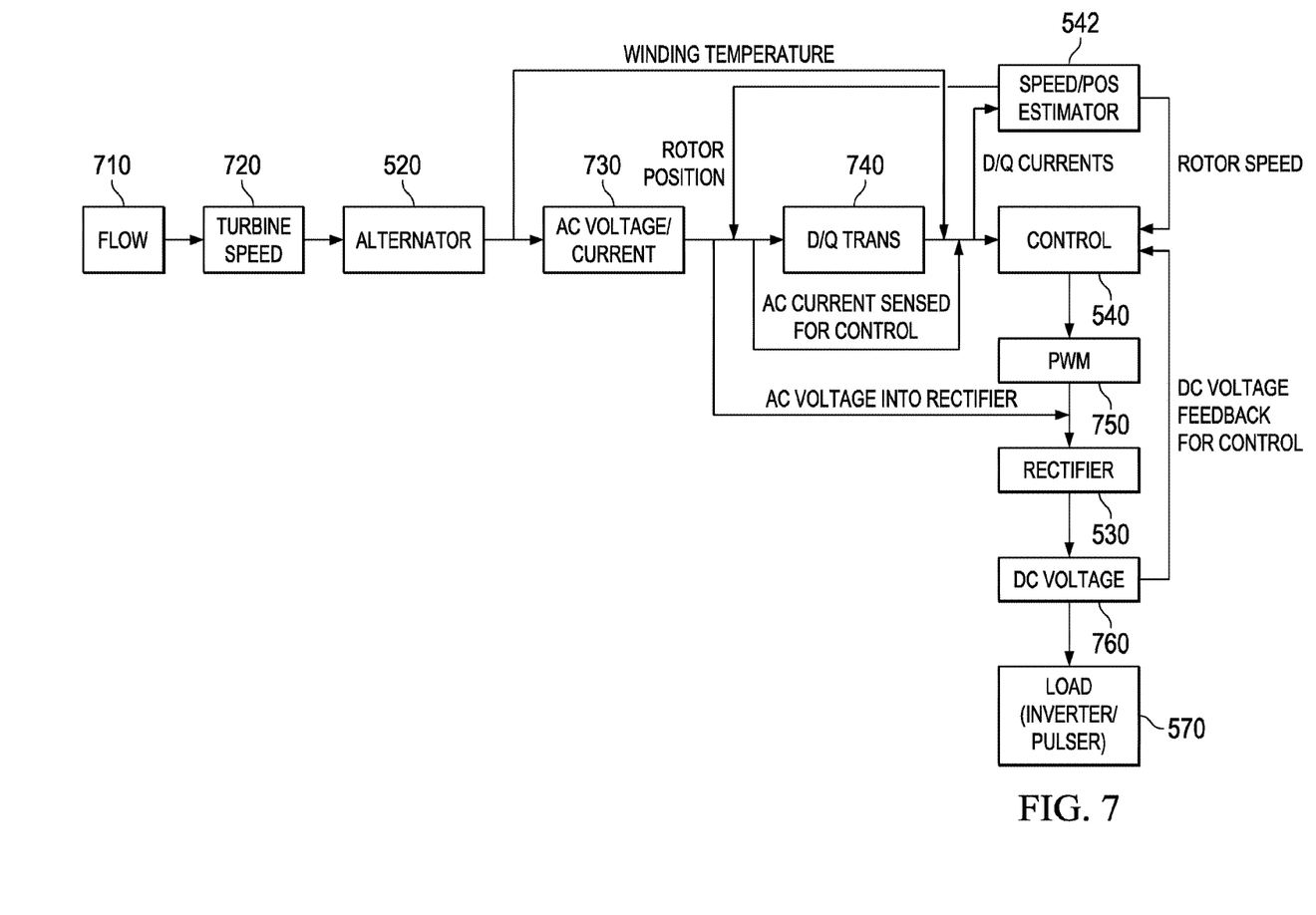
FIG. 7 shows a signal flow diagram showing an operational embodiment of the power generation system shown in FIGS. 5 and 6.

FIG. 7 shows a signal flow diagram showing an operational embodiment of the power generation system shown in FIGS. 5 and 6, which carries out the sensorless active rectification control. A fluid flow 510 in the well spins the turbine 510, and a speed 720 of the turbine may be translated to the AC voltage/current 730 by the alternator 520. The AC voltage/current 730 may be provided for a dq transform 740. The dq currents resulted from the dq transform 740 may be provided to the speed and position estimator 542, which in turn provides a rotor position back to the dq transform 740 and outputs a rotor speed. The sensorless ARC 530 may then collect and process the AC voltage/current 730 from the alternator 520, the dq currents from the dq transform 740, the winding temperature form the alternator 520, and the rotor speed estimated by the speed and position estimator 542, in order to generate PWM switching signals 750. The PWM switching signals 750 may be provided for the active rectification in the first converter 530 along with the AC voltage/current 730 from the alternator 520 to generate a DC voltage 760, which may be used to power the electrical load 570.

Figure 8:
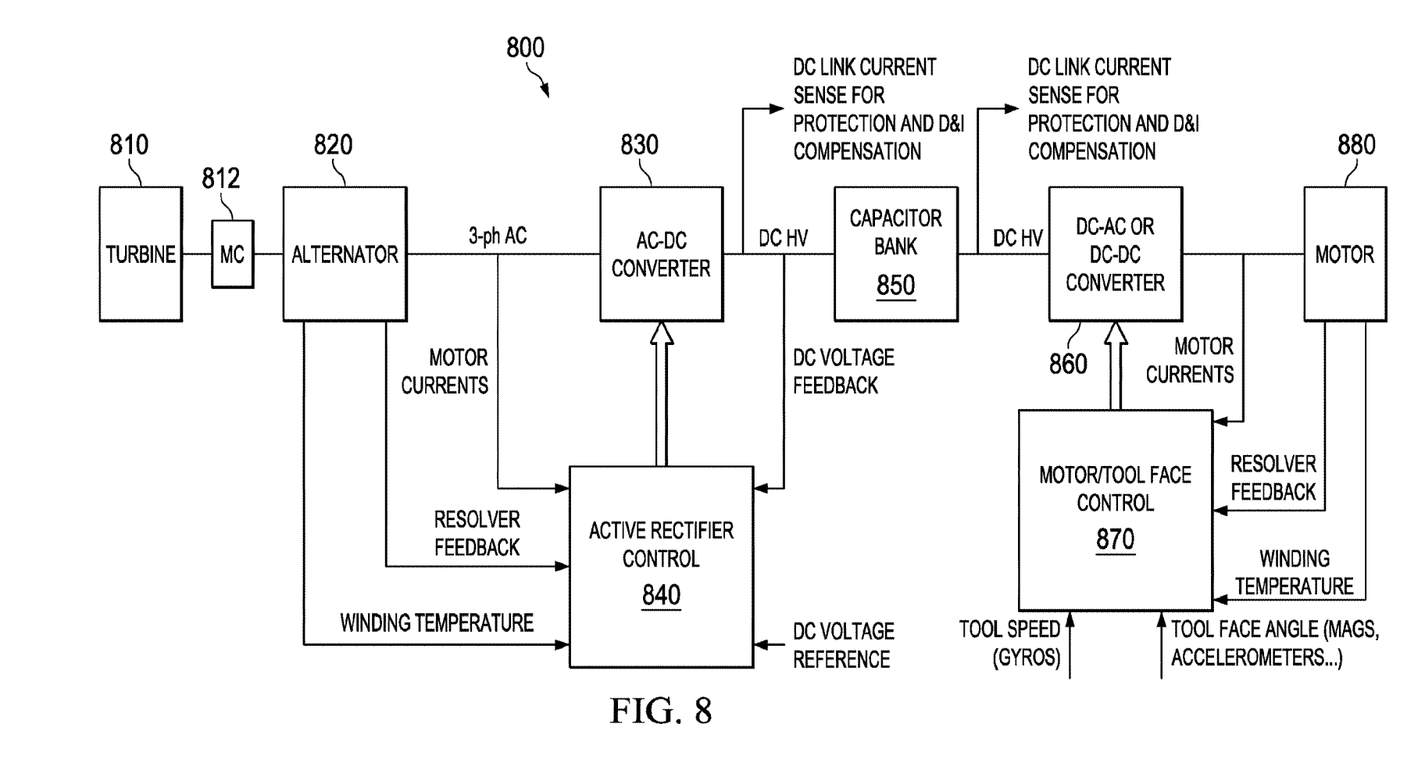
FIG. 8 shows an example of a power generation system according to another embodiment of the disclosure.
Figure 9A:
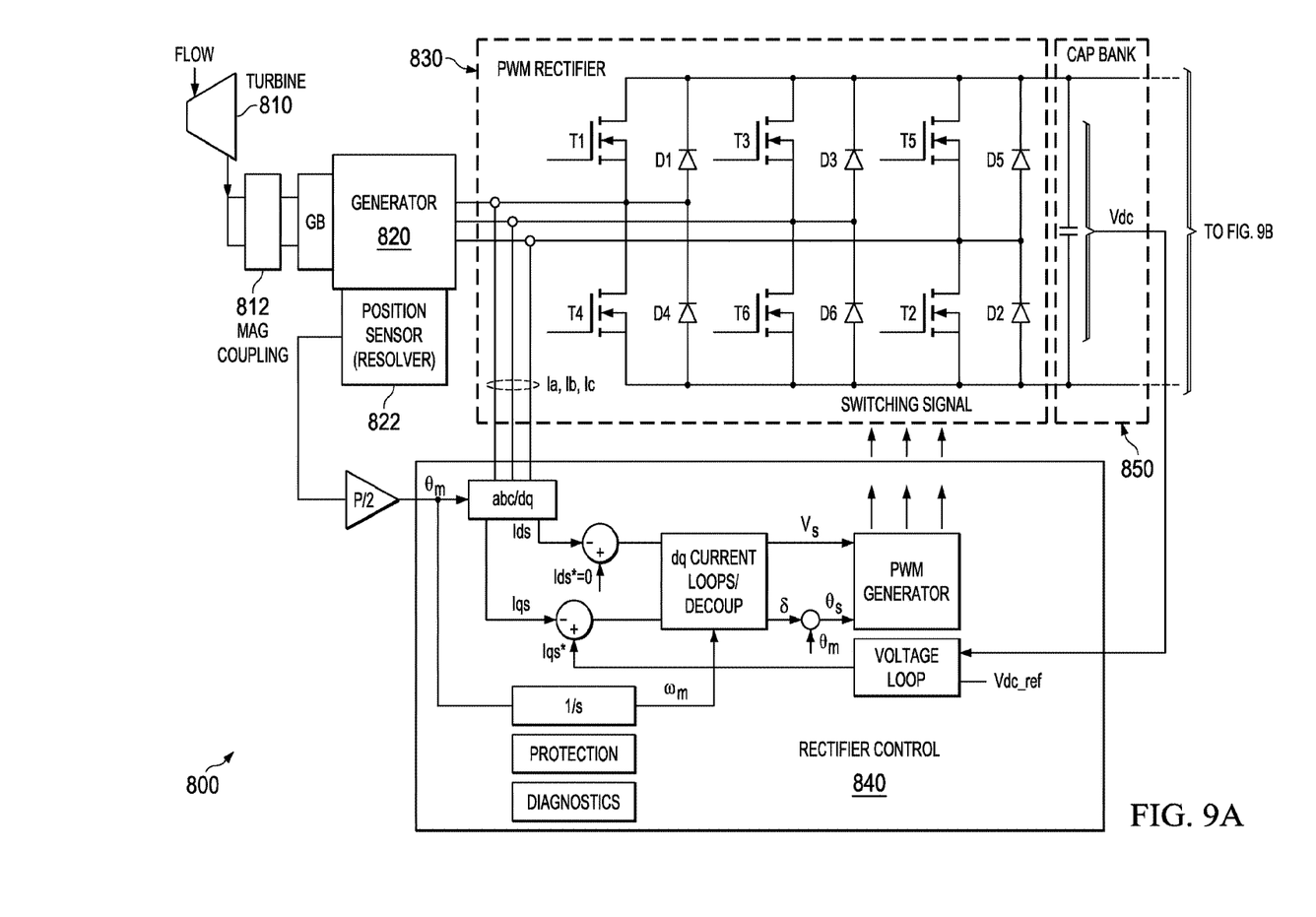
FIGS. 9A and 9B show a schematic diagram of an embodiment of the power generation system shown in FIG. 8.
Figure 9B:
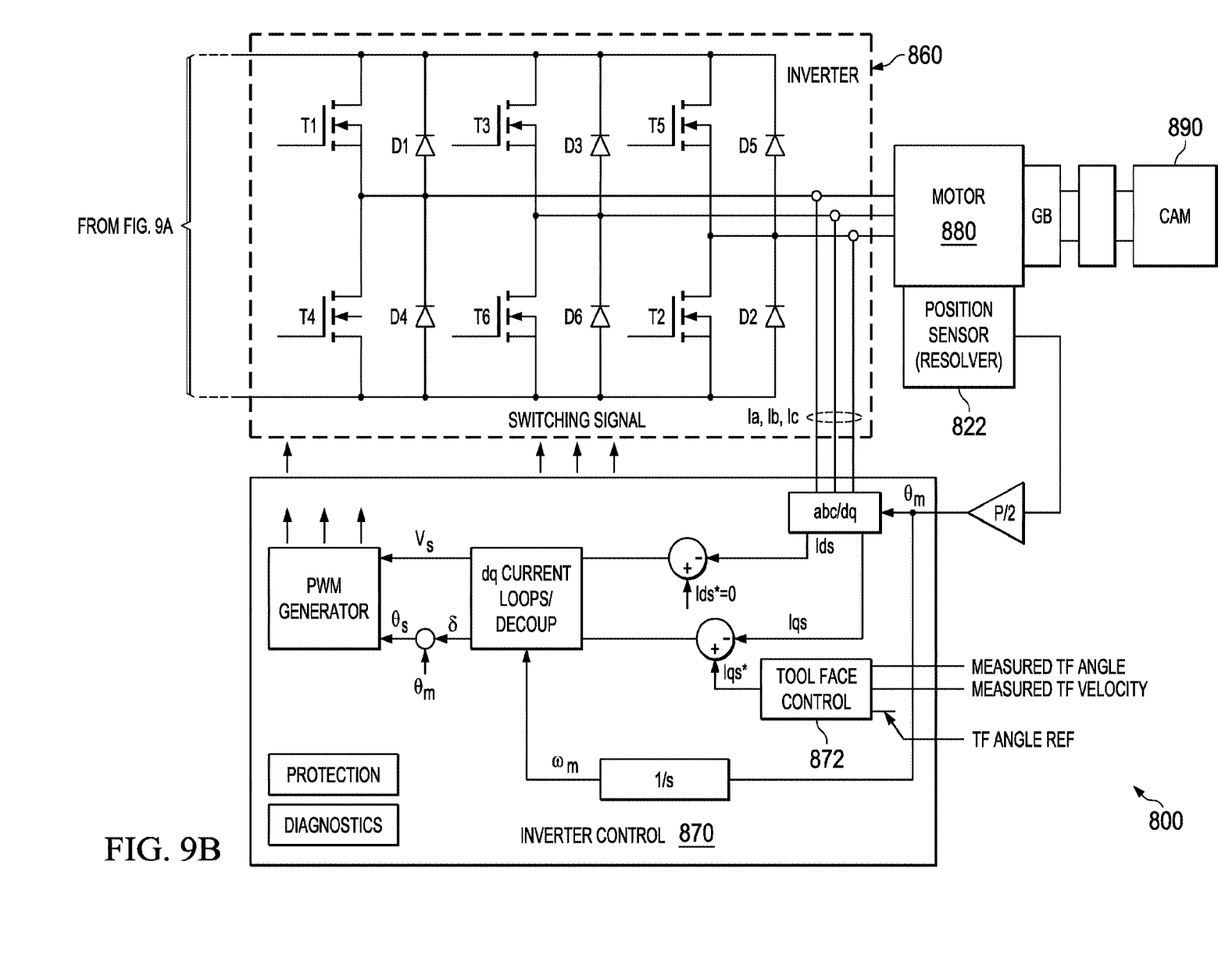

The active rectification control schemes of the systems 100, 500 may be used in various applications including down-hole tool applications. FIG. 8 shows an example of a power generation system 800 according to another embodiment of the disclosure, in which the features of the systems 100, 500 are applied to a rotary steerable system (RSS). FIGS. 9A and 9B show a schematic diagram of an embodiment of the power generation system 800 shown in FIG. 8. The system 800 may be constructed substantially similar to system 100 except for an additional active rectification control 870 to supply a permanent-magnet synchronous motor (PMSM) drive. The PMSM drive may be position-controlled with a resolver feedback.

FIGS. 8 and 9 concurrently, the system 800 may include a turbine 810, an alternator 820, a first converter 830, a first ARC 840, a capacitor bank 850, a second converter 860, a second ARC 870, a motor 880 and a CAM 890. The turbine 810 may be coupled to the alternator 820 via a magnetic coupling 812. The first converter 830, which may be an AC to DC converter, may be coupled between the alternator 820 and the capacitor bank 850. The active rectification in the first converter 830 may be controlled by the ARC 840 in a similar manner that the ARC 140 controls the active rectification in the first converter 130 in FIG. 1. The second converter 860, which may be a DC to AC converter or an AC to DC converter, may be coupled between the capacitor bank 850 and the motor 880. The second converter 860 may be controlled by the second ARC 870.

The ARC 840 may control the active rectification in the first converter 830 in a similar manner that the ARC 140 controls the active rectification in the first converter 130 in FIG. 1, using a feedback from a position sensor/resolver 822 shown in FIG. 9A. The second ARC 870 may be constructed substantially similar to the ARC 840 except for a motor/tool face control 872. The motor/tool face control 872 may collect a tool speed from a gyro or the like, a tool/face angle and velocity from an accelerometer or the like and a winding temperature from the motor 880. Also, the second ARC 870 may use a feedback from a position sensor/resolver 882 associated with the motor 880 and a three-phase AC output from the second converter 860 to generate PWM signals for controlling the second converter 860. The second ARC 870 may be a mirror image of the first ARC 840 as shown in FIG. 9B. The second ARC 870 may function as a temporary generator when the motor 880 breaks or gets struck, which may be detected by the position sensor/resolver 882. As described above, any regenerated energy from the motor 880 may be diverted directly to the active rectifier of the first converter 830, which may load the turbine 810 to dissipate the excess energy.

Figure 10:
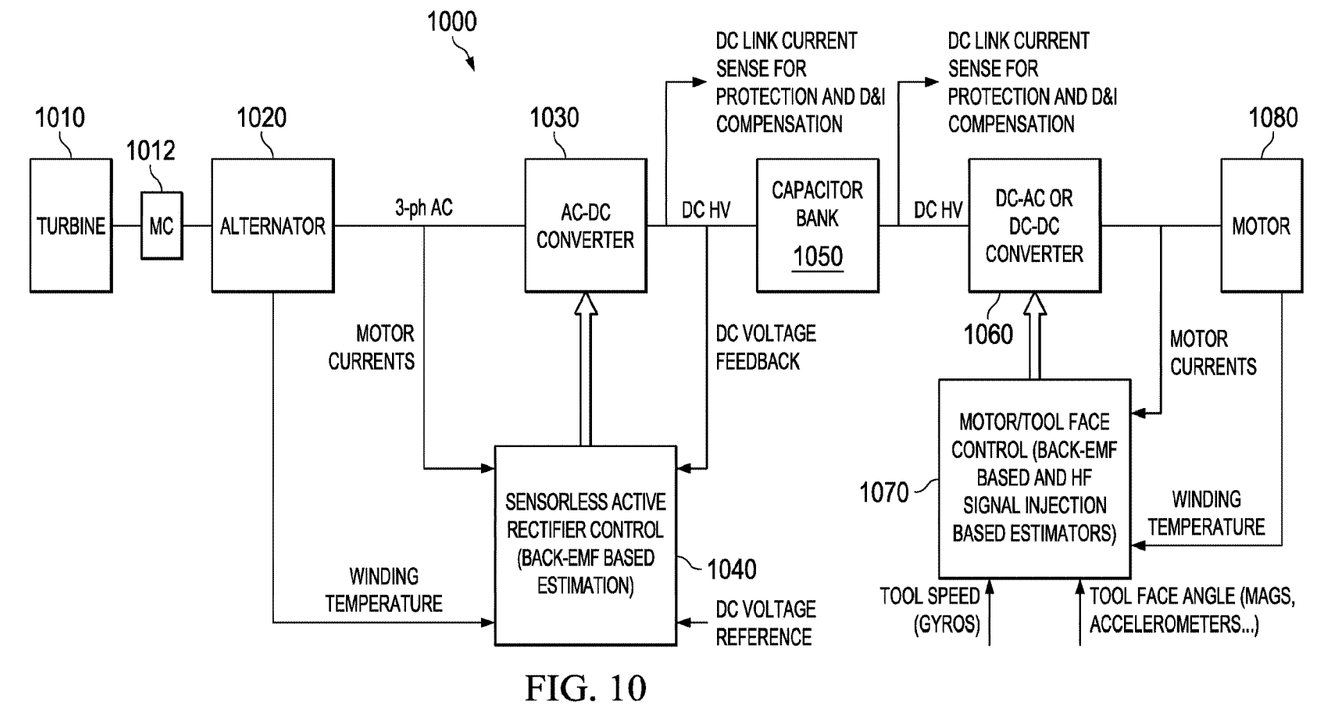
FIG. 10 shows an example of a power generation system according to another embodiment of the disclosure.

The system 800 shown in FIG. 8 may be modified to adapt the sensorless active rectification scheme shown in FIGS. 5-7. For example, FIG. 10 shows an example of a power generation system 100 according to another embodiment of the disclosure, in which resolver connections are eliminated. The system 100 may include a turbine 1010, an alternator 1020, a first converter 1030, a first ARC 1040, a capacitor bank 1050, a second converter 1060, a second ARC 1070, a motor 1080. The system 100 may be constructed substantially similar to the system 800 shown in FIG. 8 except that the position sensors/resolvers 822, 882 are eliminated and a speed and position estimator (shown in FIG. 6) is included in the first and second ARCs 1040, 1070 for a sensorless active rectification control of the first and second converters 1030, 1060, respectively. The rotor flux may be estimated using the back-EMF at high speeds, and the rotor position at low speeds may be estimated using high frequency signal injection.

Figure 11:
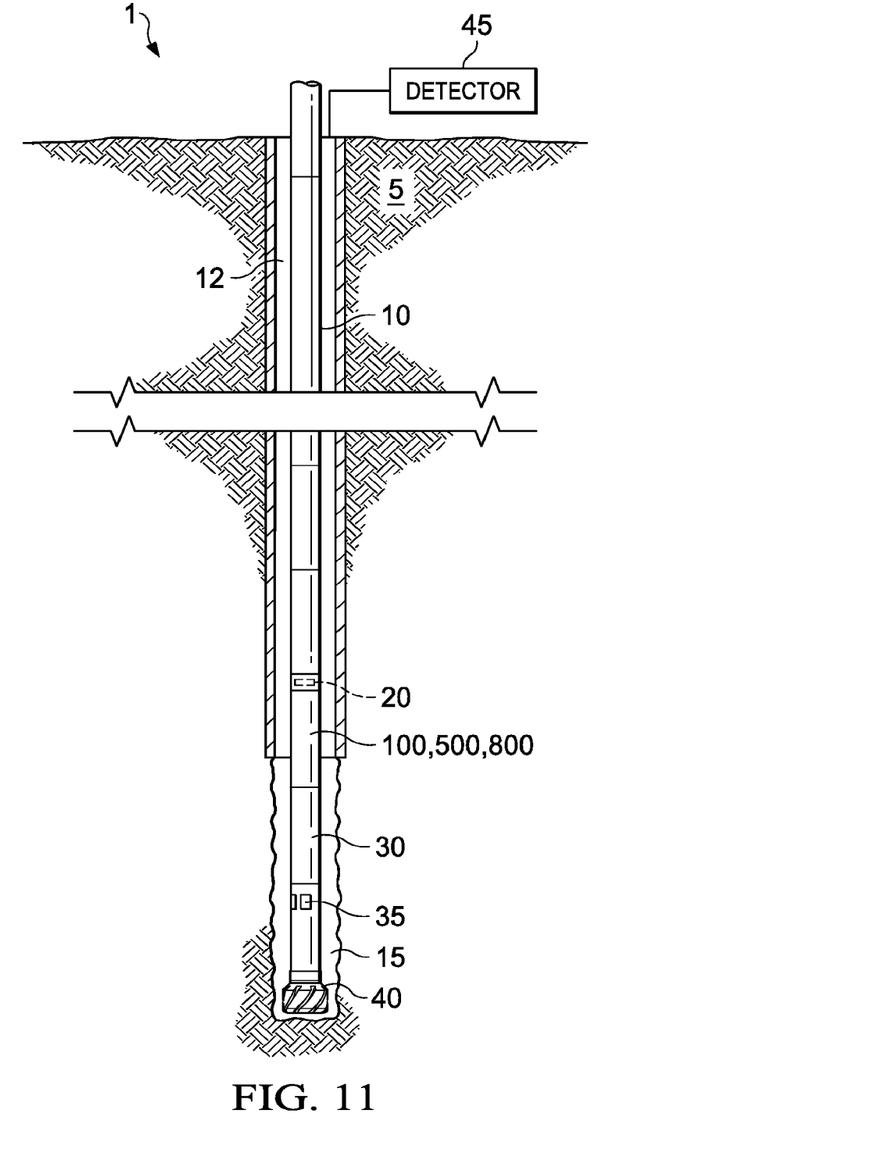
FIG. 11 shows an example of a well system utilizing any one of the power generation systems of FIG. 1, 5 or 8.

FIG. 11 shows an example of a well system 1 utilizing any one of the systems 100, 500, 800 for powering one or more downhole tools or devices. The well system 1 is shown with a wellbore 15 placed in a formation 5 and may include a well string 10, an annulus 12, a mud valve 20, a power generation system 100, 500, 800, a data encoder 30, at least one downhole tool 35 which may be a measuring tool, and a drilling bit 40. The data encoder 30 may be operationally connected to the at least one downhole tool 35 and may encode information received from the at least one downhole tool 35 for sending to a detector 45 at the surface such as by telemetry. This is just one example arrangement of a well system and other arrangements may include more, less or other devices as can be employed in various drilling or production operations. The power systems 100, 500, 800 may generate power as described herein for any downhole tool or tools including, but not limited to, LWD and MWD tools. Moreover, the power systems 100, 500, 800 may be utilized in different types of well drilling operations such as lateral or directional drilling.

One aspect of the present disclosure provides a power generation system for a drilling tool. The system includes a turbine adapted to be driven by a fluid flow in a well, an alternator coupled to the turbine and to generate an alternative current (AC), a converter to convert the AC to direct current (DC) and carries out active rectification, and a first active rectifier control (ARC) to control the active rectification of the converter.

The first ARC may control the active rectification based on the AC and a winding temperature from the alternator and the DC from the first converter.

The power generation system may further include a first resolver associated with the alternator. The first ARC may control the active rectification further based on a feedback from the first resolver.

The first ARC may include a space and position estimator that estimates a back-electromotive force (EMF).

The power generation system may further include a capacitor bank coupled to the first converter, a second converter coupled to the capacitor bank and carrying out an active rectification, and a load of the drilling tool coupled to the second converter.

The power generation system may further include a second ARC that controls the active rectification of the second converter.

The second ARC may control the active rectification of the second converter based on a DC output from the second converter.

The electrical load may include a motor and a second resolver associated with the motor. The second ARC may control the active rectification of the second converter further based on a feedback from the second resolver and a winding temperature from the motor.

The second ARC may include a motor or tool face control.

The second ARC may include a space and position estimator that estimates one or more of a rotor flux and a rotor position.

The first and second converters may include a pulse width modulation (PWM) rectifier that carries out the active rectification.

The first converter may be an AC to DC converter and the second converter may be one of a DC to AC converter and a DC to DC converter.

The first ARC may control the active rectification further based on regenerated energy from the load.

According to another aspect of the disclosure, a power generation method for a drilling tool includes spinning a turbine of the drilling tool using a fluid flow within a well. The turbine is coupled to an alternator. Mechanical energy generated by the spinning of the turbine is converted to electrical energy including a first alternating current (AC) at the alternator. The first AC is rectified to convert to a direct current (DC). The rectifying is automatically controlled based on the first AC, the DC and a winding temperature of the alternator.

The rectifying may be automatically controlled further based on a feedback from a resolver associated to the alternator.

The rectifying may be automatically controlled further based on a back-electromotive force (EMF) estimation.

The power generation method may further include converting the DC to a second AC, powering a motor of the drilling tool with the second AC, and automatically controlling the converting the DC to the second AC based on the AC and a winding temperature of the motor.

The DC may be converted to the second AC further based on a feedback form a second resolver associated with the motor.

The DC may be converted to the second AC further based on a back-EMF estimation.

The rectifying may be automatically controlled further based on regenerated energy from a load of the drilling tool.

Numerous variations and modifications will become apparent to those skilled in the art. It is intended that the following claims be interpreted to embrace all such variations and modifications.

What is claimed is:

1. A power generation system for a drilling tool, comprising:
   a turbine adapted to be driven by a fluid flow in a well;
   an alternator coupled to the turbine and to generate an alternative current (AC);
   a first converter to convert the AC to direct current (DC) and to carry out active rectification;
   a capacitor bank coupled to the first converter;
   a second converter coupled to the capacitor bank and carrying out an active rectification;
   a load of the drilling tool coupled to the second converter;
   a first active rectifier control (ARC) to control the active rectification of the first converter,
      wherein the first ARC controls the active rectification based on the AC and a winding temperature from the alternator and the DC from the first converter; and
   a first resolver associated with the alternator, wherein the first ARC controls the active rectification further based on a feedback from the first resolver, wherein the first ARC controls the active rectification further based on regenerated energy from the load.

2. The power generation system of claim 1, wherein the first ARC comprises a space and position estimator that estimates a back-electromotive force (EMF).

3. The power generation system of claim 2, wherein the first ARC automatically controls the rectifying further based on a back-electromotive force (EMF) estimation.

4. The power generation system of claim 1, further comprising a second ARC that controls the active rectification of the second converter.

5. The power generation system of claim 4, wherein the second ARC controls the active rectification of the second converter based on a DC output from the second converter.

6. The power generation system of claim 5, wherein the load comprises a motor and a second resolver associated with the motor, and
   wherein the second ARC controls the active rectification of the second converter further based on a feedback from the second resolver and a winding temperature from the motor.

7. The power generation system of claim 6, wherein the first and second converters comprise a pulse width modulation (PWM) rectifier that carries out the active rectification.

8. The power generation system of claim 5, wherein the second ARC comprises a motor or tool face control.

9. The power generation system of claim 5, wherein the second ARC comprises a space and position estimator that estimates one or more of a rotor flux and a rotor position.

10. The power generation system of claim 1, wherein the first converter is an AC to DC converter and the second converter is one of a DC to AC converter and a DC to DC converter.

11. A power generation method for a drilling tool, comprising:
   spinning a turbine of the drilling tool using a fluid flow within a well, the turbine coupled to an alternator;
   converting mechanical energy generated by the spinning of the turbine to electrical energy comprising a first alternating current (AC) at the alternator;
   rectifying the first AC to convert to a direct current (DC); and
   automatically controlling the rectifying based on the first AC, the DC and a winding temperature of the alternator.

12. The power generation method of claim 11, wherein the rectifying is automatically controlled further based on a feedback from a resolver associated to the alternator.

13. The power generation method of claim 12, further comprising:
   converting the DC to a second AC;
   powering a motor of the drilling tool with the second AC; and
   automatically controlling the converting the DC to the second AC based on the first AC and a winding temperature of the motor.

14. The power generation method of claim 13, wherein the DC is converted to the second AC further based on a feedback from a second resolver associated with the motor.

15. The power generation method of claim 14, wherein the DC is converted to the second AC further based on a back-EMF estimation.

16. The power generation method of claim 11, wherein the rectifying is automatically controlled further based on regenerated energy from a load of the drilling tool.

* * * * *